United States Patent [19]

Tanner

[11] Patent Number: 4,947,888

[45] Date of Patent: Aug. 14, 1990

[54] TOXIC FLUID AND VAPOR HANDLING APPARATUS

[76] Inventor: Thomas Tanner, One Deer Run Ct., East Brunswick, N.J. 08816

[21] Appl. No.: 365,429

[22] Filed: Jun. 13, 1989

[51] Int. Cl.[5] .......................... B67D 5/32; F16K 31/02; F17D 5/00

[52] U.S. Cl. ..................................... 137/312; 137/392; 137/428; 137/558; 141/86; 222/40; 222/108; 340/605; 340/616; 340/620; 340/625; 417/36

[58] Field of Search ............... 137/312, 314, 392, 428, 137/558; 141/86, 198; 222/40, 51, 67, 108; 340/605, 616, 618, 620, 625; 417/36

[56] References Cited

U.S. PATENT DOCUMENTS

| | | | |
|---|---|---|---|
| 2,853,149 | 9/1958 | Gosselin | 137/428 |
| 2,922,553 | 1/1960 | Wilson | 222/108 |
| 3,069,671 | 12/1962 | Taylor | 137/312 |
| 3,096,781 | 7/1963 | Roidt | 137/314 |
| 3,148,699 | 9/1964 | Shindler | 137/312 |
| 3,482,377 | 12/1969 | Walrave | 137/312 |
| 3,712,330 | 1/1973 | Davis | 137/312 |
| 4,457,349 | 7/1984 | Vazin | 141/86 |
| 4,527,708 | 7/1985 | Dundas et al. | 220/18 |
| 4,541,446 | 9/1985 | Hogan | 417/36 |
| 4,603,432 | 7/1986 | Marino | 137/312 |
| 4,641,680 | 2/1987 | Been | 137/392 |
| 4,729,404 | 3/1988 | Hergenroeder | 137/602 |
| 4,796,658 | 1/1989 | Caple | 137/312 |
| 4,842,163 | 6/1989 | Bravo | 222/40 |

*Primary Examiner*—George L. Walton

*Attorney, Agent, or Firm*—Mathews, Woodbridge & Collins

[57] ABSTRACT

A trough surrounding the base of a machine for trapping the spilled chemical and draining it into a pit in which a pump is located that is automatically engaged to pump the spilled chemical into a closed holding tank. A vapor detecting device will, upon the detection of toxic vapors, automatically turn on a ventilation system that will remove vapors from the area of the trough and from an optional isolation tent surrounding the machine and force the vapors through a filter having a bed of charcoal for absorbing the toxic vapors from the air. The filtered air is then vented to the atmosphere. A splash curtain is also used to direct the spilled chemicals into the trough. A substantial portion of the apparatus may be molded as a single unit or as separate sections that may be readily assembled and fixed into a unit at the installation site.

18 Claims, 5 Drawing Sheets

TOXIC FLUID AND VAPOR HANDLING APPARATUS

BACKGROUND OF THE INVENTION

The present invention relates to a toxic fluid and vapor handling apparatus. More particularly, the invention pertains to a chemical spill containment system wherein spilled toxic chemicals and vapors are automatically contained and safely removed to prevent contamination.

DESCRIPTION OF THE PRIOR ART

Many industrial systems employ machines that contain and use large quantities of potentially harmful chemicals. These machines often include a variety of elements, such as pumps, stills, filters, condensers, storage tanks, and the like that contain or process significant amounts of toxic chemicals. Those concerned with the use or deployment of such machines, especially for use in populated areas, have long recognized the potential dangers that these machines pose when one or more of their elements ruptures or otherwise fails thereby causing a chemical spill. Manufacturers of such machines, being mindful of these potential hazards, have made great efforts in increasing machine reliability by using some of the most advanced materials and methods in their manufacture. Additionally, the ENVIRONMENTAL PROTECTION AGENCY (EPA) and the OCCUPATIONAL SAFETY AND HEALTH ADMINISTRATION (OSHA) have issued numerous regulations that manufacturers and users of such equipment are required to follow. However, in spite of these efforts, chemical spills from ruptured machine parts still occur.

As an important example, in the dry cleaning industry, it has been the general practice to employ large dry cleaning machines that use significant quantities of toxic cleaning fluids. A typical machine might use up to 100 gallons or more of a potentially dangerous chemical such as perchloroethylene or tetrachloroethylene. As is well known, these dry cleaning machines are frequently used in local neighborhoods and shopping centers populated by employees, customers, neighbors, etc. where the effects of a chemical spill may be critical. Again, OSHA and the EPA have published regulations for the dry cleaning industry on what actions must be taken in the event of a chemical spill. These regulations are primarily directed at the elimination of such chemical-spill hazards as improper ventilation; toxic vapors caused by the chemicals being exposed to open flames, sparks and electric circuits; contamination of water systems; and leakage of the spilled chemicals into nearby buildings. Additionally, workers in the dry cleaning field have been warned against the inhalation of vapors from dry cleaning fluids, the prolonged or repeated contact of the liquid with the skin or other body parts, the swallowing of the liquid, and the splashing of the liquid into the eyes. Exposure to a high-vapor concentration of some dry cleaning fluids can cause severe depression of mental functions, respiratory failure and even death. OSHA has recently released standards aimed at protecting workers from exposure to atmospheres having perchloroethylene vapor concentrations greater than 25 parts per million. This concentration can be found in many dry cleaning establishments during normal operation of the dry cleaning machinery. In response to the OSHA standard, some in the industry have proposed that workers routinely use cartridge respirators or masks having an independent air supply. A notification published by the industry for display in establishments using dry cleaning machines that employ perchloroethylene give the following instructions in the event of a spill or leak:

> "Evacuate the area, ventilate, and avoid breathing vapors. Dike area to contain spill. Personnel wearing proper protective equipment including air line respirator or self-contained breathing apparatus, with full facepiece, should clean up area by mopping or with absorbent material and place in closed containers for disposal. Avoid contamination of ground and surface waters. Do not flush to sewer".

Additionally, in some geographical areas regulations require that a spill of as little as five gallons of perchloroethylene must be reported to certain organizations such as the local fire and police departments, the sewer and water departments, OSHA, EPA, the National Response Center, etc. Although there has been a long recognized need for a chemical spill containment system for use in the dry cleaning industry and similar industries that use large chemical processing machinery, no practical system for so-doing has yet been devised. The present invention fulfills this need.

SUMMARY OF THE INVENTION

The general purpose of this invention is to provide a chemical spill containment apparatus, for use with large industrial, chemical processing machinery, that operates automatically to detect a spill and responds thereto by trapping and removing the chemical fluids and vapors from the open area adjacent the machinery. To attain this, the present invention contemplates a trough surrounding the base of the machine for trapping the spilled chemical and draining it into a pit in which a pump is located that is automatically engaged to pump the spilled chemical into a closed holding tank. Simultaneously, a vapor detecting device will automatically turn on a ventilation system that will suck vapors from the area of the trough and from an optional isolation tent surrounding the machine and force the vapors through a filter having a bed of charcoal for absorbing the toxic vapors from the air. The filtered air is then vented to the atmosphere. A splash curtain is also used to direct the spilled chemicals into the trough. A substantial portion of the apparatus may be molded as a single unit or as separate sections that may be readily assembled and fixed into a unit at the installation site.

It is, therefore, an object of the present invention to provide a chemical spill containment system.

Another object is the provision of a means for automatically detecting a chemical spill and for taking a plurality of actions to remove the liquid chemical and toxic vapors from the area immediately adjacent the source of the spill.

A further object of the invention is the provision of a means for continuously removing small but significant concentrations of a toxic vapor from the atmosphere adjacent a chemical processing machine during periods of normal operation.

Other objects and many of the attendant advantages of this invention will be readily appreciated as the same becomes better understood by reference to the following detailed description when considered in connection with the accompanying drawings in which like reference numerals designate like parts throughout the figures thereof.

DETAILED DESCRIPTION OF THE PREFERRED EMBODIMENT

Figure 1:
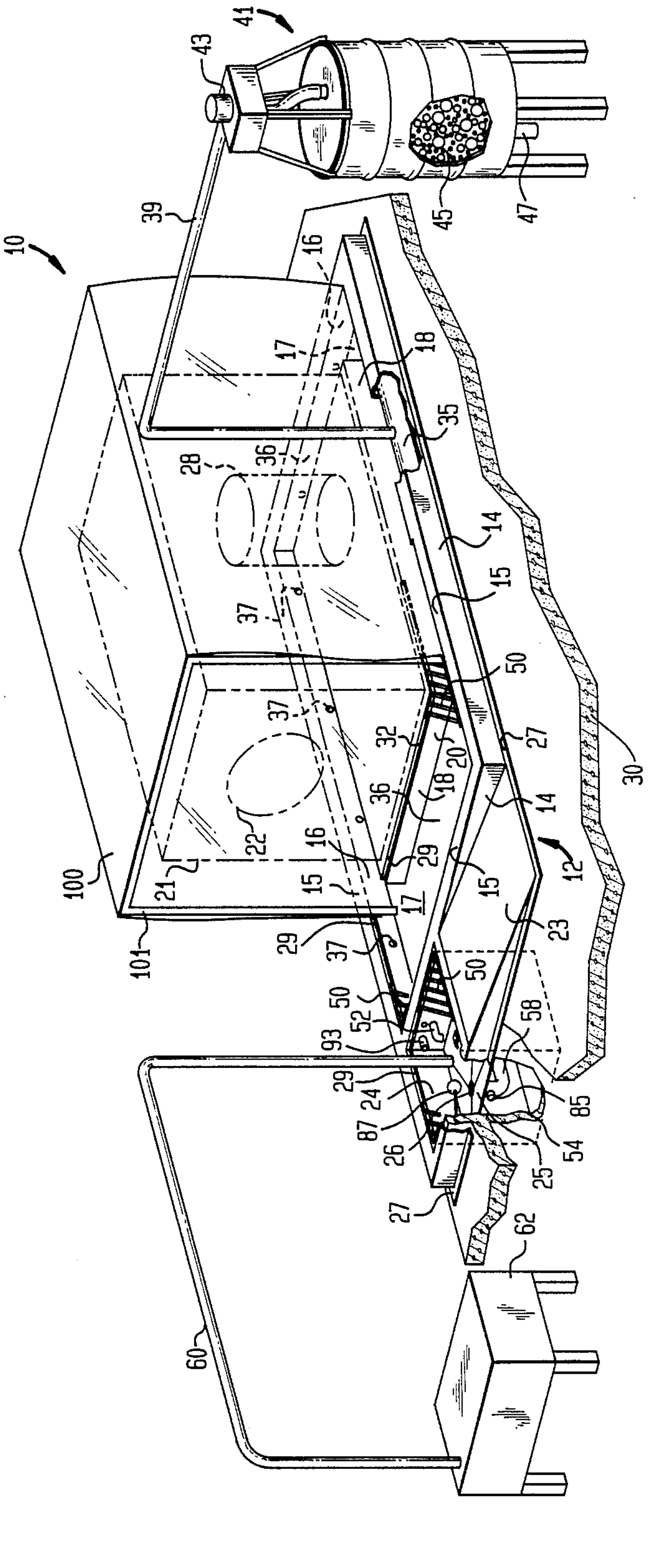
FIG. 1 shows a pictorial view partly in section of a preferred embodiment.

Referring now to the drawings, there is shown a chemical spill containment system 10 having a liquid trapping unit 12 that may be fabricated from plastic, fiberglass or other suitable material. Unit 12 includes an outer wall 14, a top wall 15, a first inner wall 16, a bottom wall 17, and a second inner wall 18. Walls 14–18 form a closed rectangular-shaped trough 36 that surrounds a raised rectangular-shaped pad 20 on which the machine 21 is mounted. Machine 21, shown in phantom lines, represents a dry cleaning machine that includes a front loading door 22 and a chemical storage tank 28. Of course, the present invention may be employed equally as well with other types of machines susceptible to chemical spills as will become evident to those skilled in these arts.

The trapping unit 12 further includes a loading ramp 23 and an adjacent liquid collection receptacle 24 having vertical sidewalls and a bottom in the form of a funnel-shaped pan 25 having a central drainage orifice 26. The unit 12 has an outer horizontal flange 27 extending from the lower edge of wall 14, ramp 23 and the outer wall of receptacle 24. The unit 12 is designed to sit on a reasonably level floor 30 formed from concrete or other suitable material with flange 27 and bottom wall 17 in contact with the floor 30. The flange 27 may be attached to floor 30 by bolts or other fastening means. A grate-receiving ledge 29 is formed at the upper edge of inner walls 16 and 18, and the inner vertical wall of receptacle 24. An inner, horizontal flange 32 extends inwardly from the ledge 29 on the wall 18 and is fixed to form a tight seal with the upper surface of pad 20. Clearly, the trapping unit 12 may be readily molded from a suitable plastic, fiberglass or other like material as a single unit or as a plurality of sections that may be assembled, joined and sealed at the installation site. The walls 14, 15 and 16 form a shell for housing a vapor exhaust conduit 35 that forms a closed loop. Conduit 35 is preferably fixed at appropriate locations to the inner surface of one or more of the walls 14, 15 and 16. At spaced intervals along the conduit 35, apertures are formed in the conduit 35 and the adjacent inner wall 16 to receive the ends of tubes 37. A vapor exhaust pipe 39 is joined to the conduit 35 and passes through wall 15 to a vapor exhaust system 41 having an exhaust fan 43 for forcing vapors from pipe 39 into a carbon bed 45 where toxic vapors are removed by filtering and clean air is vented via vent conduit 47.

The trough 36 and the receptacle 24 are covered by removable grates 50 to form a walkway to permit access to the machine 21. The loading ramp 23, on which a wheeled container may be easily moved, permits easy access to the loading door 22. Grate 50, typically made of several individual pieces for easy installation and removal, is supported by ledge 29.

Figure 4:
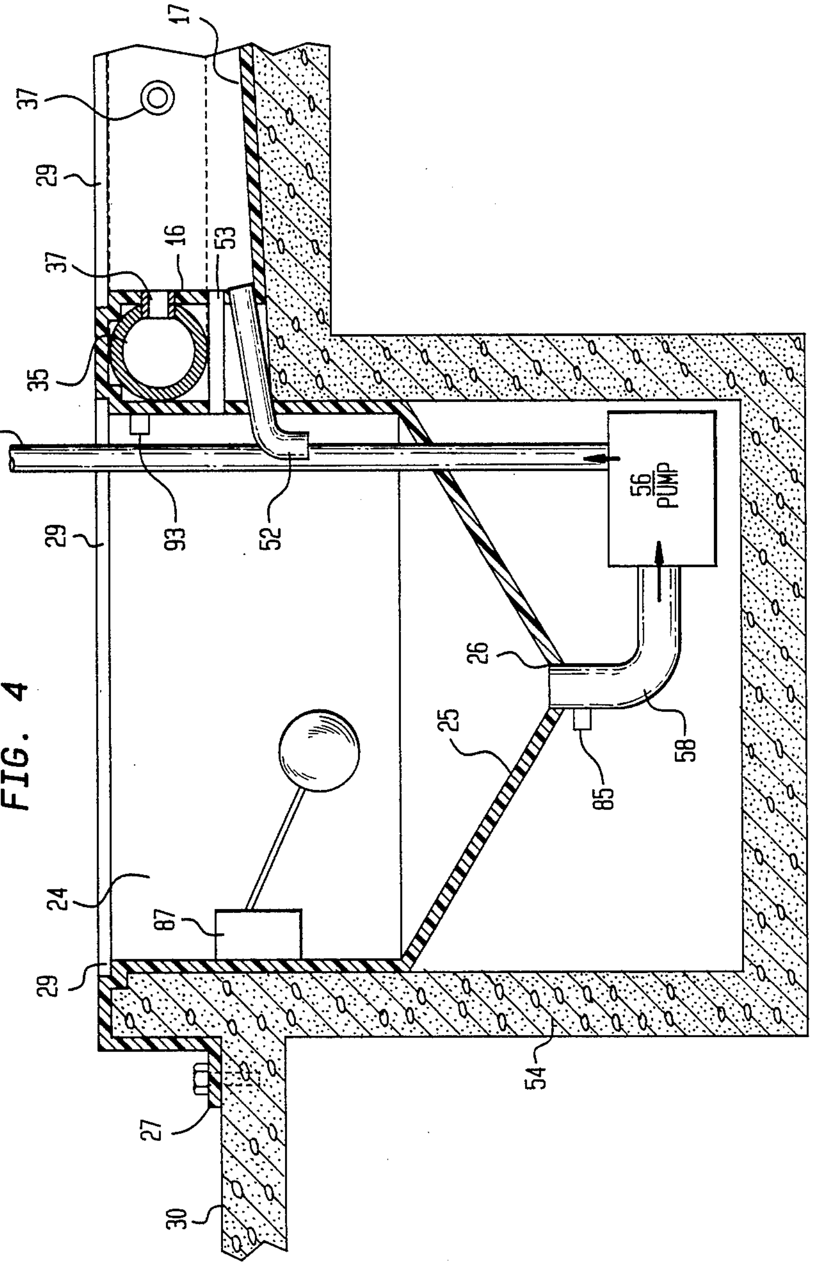
FIG. 4 is an elevation in section of a portion of the device including the pit shown in FIG. 1.
Figure 5:
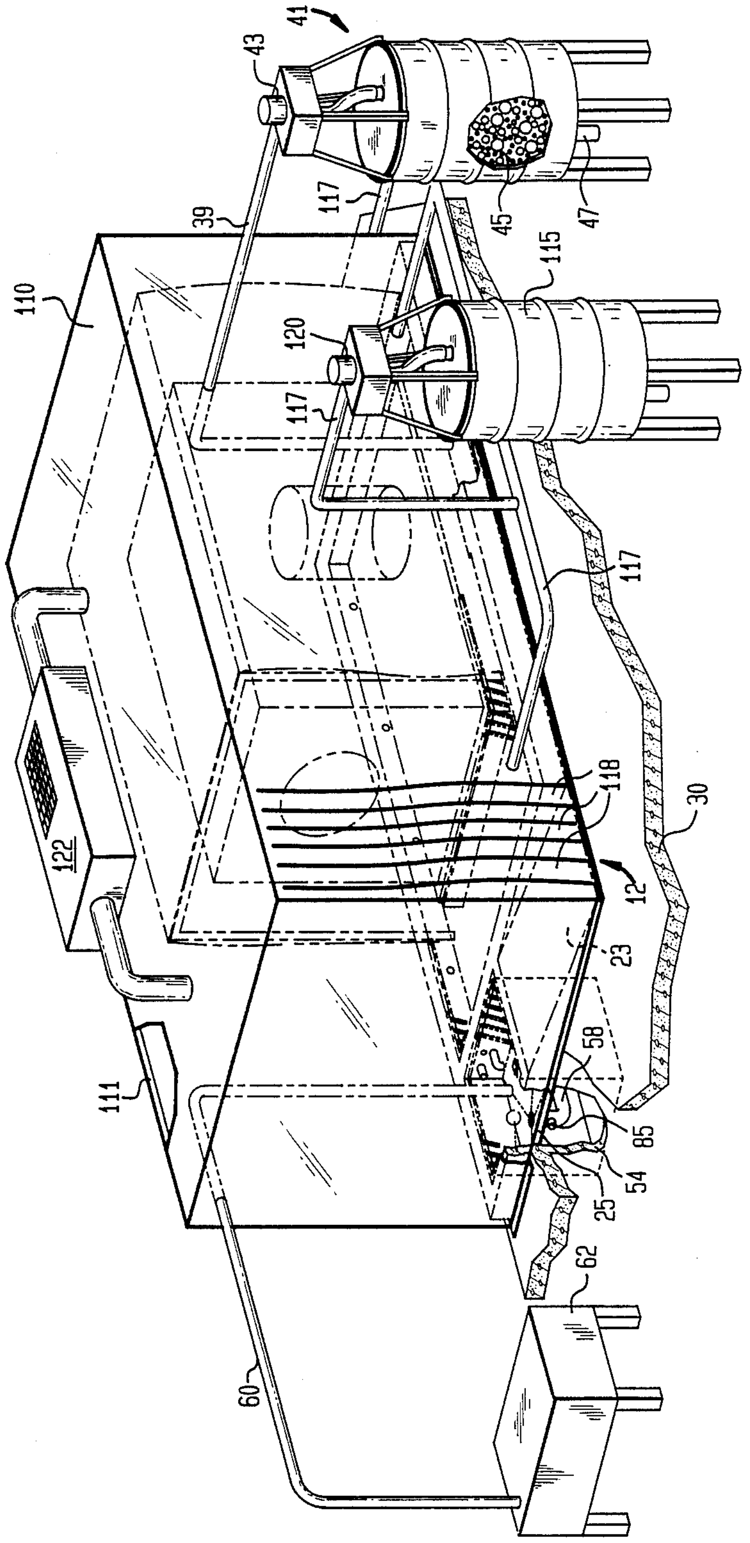
FIG. 5 shows a view similar to the view shown in FIG. 1 with parts shown in phantom.

The bottom wall 17 of trough 36 is pitched at a slight angle towards the location of receptacle 24. As such, the floor 30, on which the bottom wall 17 preferably rests, may also be pitched at this slight angle (FIG. 4). A drainage pipe 52 passes from the lowest point of trough 36 into the receptacle 24. An overflow pipe 53 also extends from trough 36 into receptacle 24 at a location just above the pipe 52 to provide additional drainage in the event that pipe 52 is blocked by debris.

The receptacle 24 is mounted in a pit 54 such that the pan 25 is located below the grade of bottom wall 17. A pump 56 is mounted in pit 54 below the pan 25. A drainage pipe 58 extends between orifice 26 and the input to pump 56. The output of pump 56 is connected by a liquid removal pipe 60 that extends through pan 25 and receptacle 24 to a sealed liquid holding tank 62 for later removal of the spilled chemicals.

A control circuit 75 (FIG. 6) automatically energizes the fan 43, pump 56, emergency equipment such as lights and other alarms 72, and a communication system 79. Additionally, circuit 75 will also shut down the ruptured machine 21 and other equipment that might pose a hazard during a chemical spill. For example, in most situations, such chemicals are susceptible to combustion when exposed to an open flame or other ignition source. Therefore, as indicated by reference character 92 in FIG. 6, the boilers and other types of machinery are shut down immediately upon detection of the chemical spill. Also, the normal building ventilation units which routinely vent and circulate air in the building are also shut down to prevent the escape of any toxic vapors to the atmosphere before cleaning the air in carbon bed 45.

Figure 6:
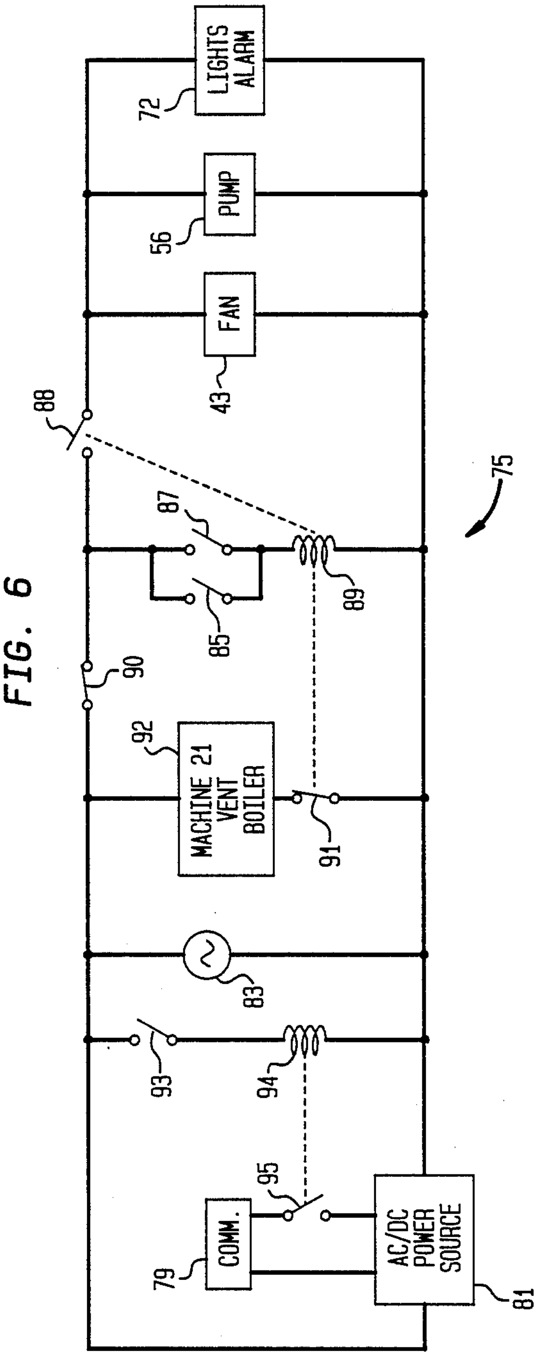
FIG. 6 is a block diagram showing the electrical controls for the preferred embodiment shown in FIG. 1.

Circuit 75 (FIG. 6) includes connections to the main AC power supply 83. A conventional liquid activated microswitch 85, mounted in drain pipe 58 (FIG. 4), and a conventional ball float switch 87 (FIG. 4), mounted in receptacle 24, are connected in parallel with each other and in series with a relay coil 89 (FIG. 6). Switches 85 and 87 are normally open and together with coil 89 are connected across power supply 83 through a manual on/off switch 90. Coil 89 is coupled to normally closed relay switch 91 and normally open relay switch 88. The main circuits 92 of the machine 21 and other normally-operating equipment that may pose a hazard are connected across the main power supply 83 through switch 91. A conventional normally open, vapor detector switch 93, located in receptacle 24 (FIG. 4), is connected in series with a relay coil 94 that is coupled to normally open latching switch 95. Coil 94 and switch 93 are connected in series with each other and across power supply 83. A conventional AC/DC power source 81 is connected across power supply 83. AC/DC source 81 provides power to the communication system 79 via switch 95. In the event of a power failure at the source 83, the power source 81 will continue to provide sufficient power to system 79 if switch 95 has been closed.

The operation of circuit 75 is as follows: When a chemical spill occurs, it is contemplated that any liquids trapped in trough 36 will drain into the pump 56 via pipe 52, receptacle 24 and pipe 58. The draining liquid will cause the switch 85 to close which will energize relay coil 89 thereby opening switch 91 and closing switch 92. Upon the closing of switch 92, the fan 43 and the pump 56 will be made operative. The pump 56 will pump the draining liquid into the sealed holding tank 62 via pipe 60. The fan 43 will remove air surrounding the trough 36 via tubes 37, conduit 35 and pipe 39. This air will be forced through the carbon bed 45 to remove any toxic vapors before exhausting the clean air into the atmosphere. It is noted here that toxic vapors from industrial chemicals such as dry cleaning chemicals are usually heavier than air and, as such, will normally accumulate at the lower levels of a given area.

The float switch 87 is provided as a backup in the event that there is a failure at the switch 85. To prevent a runaway spill due to a blockage at pump 56 or a power failure or other reason that prevents pump 56 from removing the spilled chemicals, it is contemplated that the volume of the effective portion of trough 36 and receptacle 24 be sufficiently large enough to be able to hold substantially all liquids from any expected chemical spill.

The vapor-operated switch 93 will detect situations in which a predetermined amount of chemical vapor has entered the surrounding atmosphere. Such situations, as mentioned earlier, usually require that certain organizations be notified. It is contemplated in the present invention that the communication system 79 be provided to automatically inform appropriate authorities and government offices over normal telephone lines that a significant chemical spill has occurred. The system 79 may also be used to inform other key management and maintenance personnel in the event of a spill occurring at an unattended machine.

As an optional feature, the system 10 may also include a transparent splash curtain 100 that is suspended by a framework 101 about the top, back and sides of machine 21. The curtain 100, formed from any suitable transparent plastic sheet, has a bottom edge that carries snaps or other like fasteners for securing the curtain 100 to the wall 16 near the upper edge so that chemicals spraying from machine 21 will be directed into trough 36. The rear and side walls of curtain 100 may have door flaps or other means for permitting easy access to the machine 21.

Figure 3:
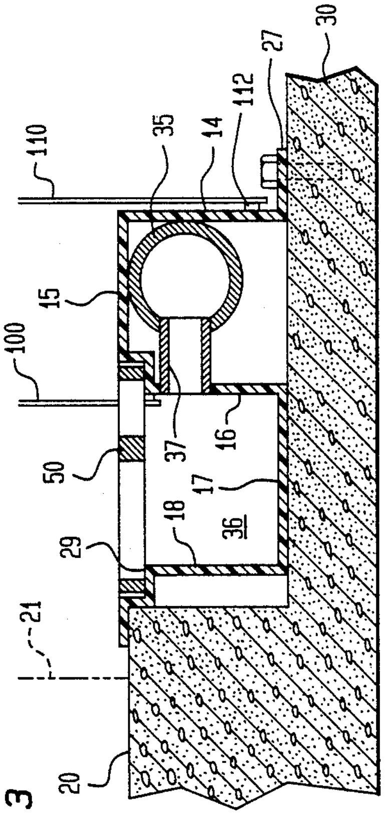
FIG. 3 is a section of the device shown in FIG. 2 taken along the lines 3—3 and looking in the direction of the arrows.
Figure 2:
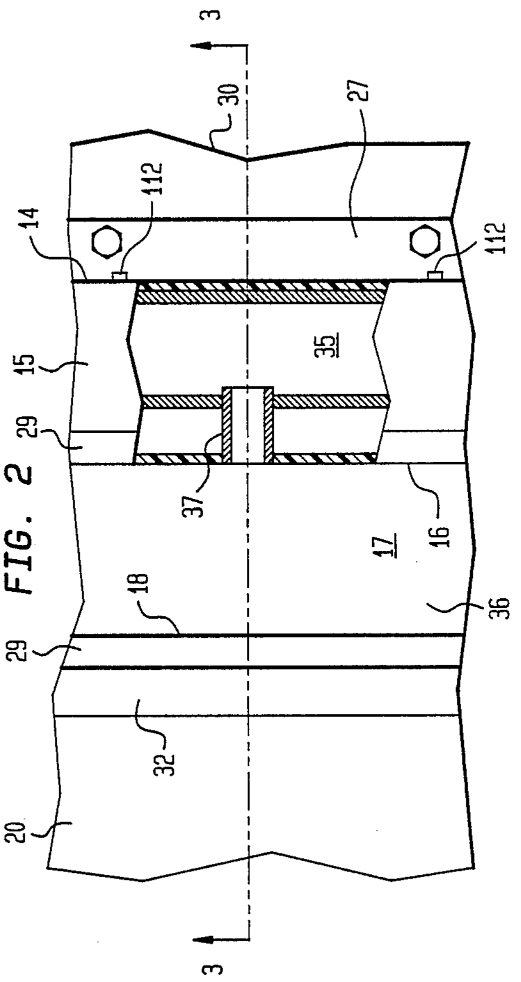
FIG. 2 shows a top view with parts broken away of a portion of the device shown in FIG. 1.

As an additional feature, the system 10 may be readily combined with an isolation tent 110 that is suspended by a framework 111 to cover the top, front, back and sides of the system 10. Like splash curtain 100, the tent 110 may be constructed of flexible transparent plastic. The bottom edges of tent 110 rest on the outside of the trapping unit 12 just above flange 27. The tent 110 is fixed to the lower portion of wall 14 (FIG. 3) by snaps 112 or other suitable means. The side wall of tent 110 in the area of the ramp 23 has an entrance opening covered by a plurality of transparent plastic strips 118 that are joined to the tent 110 at their upper ends and are otherwise permitted to hang free in a contiguous or overlapping fashion with each other to prevent the escape of vapors while permitting access to the ramp 23 by forming a partial seal at the entrance opening.

A carbon sniffer 115, having a pipe 117 connected to select locations of the tent 110 just above the level of wall 15, includes an exhaust fan 120 for removing air from tent 110 during normal operation of the machine 21. Fresh air is supplied to the tent 110 by a fresh air fan 122. The isolation tent 110 and sniffer 115 continuously remove the air surrounding machine 21 near the lower levels and replaces the air with fresh air via fan 122. As such, tent 110, sniffer 115 and fan 122 cooperate with the system 10 to continuously clean the atmosphere during normal operation of the machine 21.

It should be understood, of course, that the foregoing disclosure relates to only a preferred embodiment of the invention and that numerous modifications as alterations may be made therein without departing from the spirit and the scope of the invention as set forth in the appended claims.

What is claimed is:

1. A chemical spill containment system comprising:

a chemical spill trapping means for containing liquid chemicals and for draining the liquid chemicals into a first location, said trapping means including a vapor conduit surrounding said trapping means, said conduit having a plurality of vent openings therein for discharging chemical vapors within said trapping means to a vapor processing unit before they are expelled to the environment as well as protecting a user that is exposed to the environment around the trapping means;

a liquid chemical receptacle mounted at the first location;

a drain means for draining liquids from the trapping means into the receptacle;

a holding tank;

means including a pump connected to said receptacle for moving liquid from the receptacle into the holding tank; and a liquid sensing means for detecting the presence of liquid in the receptacle and for energizing the means for moving liquid from the receptacle into the holding tank.

2. The system of claim 1 wherein the pump is an electric pump, and further including a power source and a relay connected across the pump, and wherein the liquid sensing means includes means for operating the relay when liquid is present in the receptacle to cause the power source to operate the pump.

3. The system of claim 1 wherein the trapping means includes a trough.

4. The system of claim 3 wherein the trough forms a continuous channel and has an inner vertical wall forming a closed loop surrounding an inner area in which a machine may be mounted.

5. The system of claim 4 wherein an elevated pad is mounted in the inner area.

6. The system of claim 5 wherein the trough has an outer wall defining a housing, and further including an exhaust means for removing vapors from the trough.

7. The system of claim 6 wherein said exhaust means includes a conduit mounted in the housing and a plurality of inlet ports extending from the conduit to the trough at spaced locations.

8. The system of claim 7 further including an exhaust fan having means connected to the conduit for drawing air from the trough via the inlet ports and the conduit.

9. The system of claim 8 further including a vapor filter coupled to the fan and to an outlet vent.

10. The system of claim 9 wherein the filter includes a bed of carbon through which the fan forces air to the outlet vent.

11. The system of claim 10 further including a splash curtain mounted above the trough and having means for directing liquid into the trough.

12. The system of claim 11 further including liquid sensing means for detecting the presence of liquid in the receptacle and for energizing the means for moving liquid from the receptacle into the holding tank.

13. The system of claim 12 wherein said means for moving liquid from the receptacle includes a pump.

14. The system of claim 13 wherein the pump is an electric pump, and further including a power source and a relay connected across the pump, and wherein the liquid sensing means includes first and second sensors having means for independently operating the relay when different quantities of liquid are present in the receptacle to cause the power source to operate the pump.

15. The system of claim 14 further including means for sensing chemical vapors above a predetermined concentration and for energizing a communication system in response to the detection of vapors by said sensing means.

16. The system of claim 14 further including lights and an alarm connected to said system and being energized upon operation of said relay.

17. The system of claim 16 further including a main power source and means responsive to the operation of said relay for disabling the power source.

18. The system of claim 17 further including an isolation tent surrounding the trapping means and the receptacle, a sniffer connected to said tent to remove air from the tent and a fresh air supply means connected to said tent to supply fresh air to the tent.

* * * * *